UNITED STATES PATENT OFFICE 2,799,567
Patented July 16, 1957

2,799,567

HERBICIDAL HALOBICYCLOHEPTENEDEDIOL CARBONATES

William K. Johnson, Dayton, Ohio, and Tad Le Marre Patton, Bellaire, Tex., assignors to Monsanto Chemical Company, St. Louis, Mo., a corporation of Delaware No Drawing. Application May 20, 1955,
Serial No. 510,052

12 Claims. (Cl. 71—2.5)

This invention relates to the Diels-Alder adducts of vinylene carbonate and halocyclopentadienes, to methods of making the same, and to the use of these adducts as herbicides.

One of the importnt developments in agricultural chemistry of recent times is the discovery of chemicals which act as selective herbicides. Prior to the discovery of such chemicals or chemical compositions, weeds could be eradicated from cultivated land only by laborious hand labor. Chemicals known to be effective in killing vegetation could not be applied to fields in which commercial crops were growing because the biocidal action of such chemicals would take effect on desired and undesired plant growth alike, indiscriminately killing or crippling all vegetation with which they came into contact. In recent years it has been found possible to synthesize chemicals of particular structures which possess a selective herbicidal action, so that, when applied in equal concentrations to adjacent plants which are of different species, they will selectively stunt or suppress entirely the growth of plants of one species while leaving those of another species completely unharmed. Such previously known herbicides have possessed various defects, however; they have been expensive, toxic, and/or selectively toxic only when applied to plants which are in a stage of active growth. It is particularly desirable to provide selective herbicides which are active on application during the dormant or pre-emergent crop season. Pre-emergent herbicides are especially important, for example, in the control of grass weeds in broad-leafed crops such as alfalfa, strawberries, asparagus, etc. The selective pre-emergent herbicides toxic towards grasses known hitherto, however, suffer from various disadvantages, such as lack of general effectiveness, toxicity to the crop plant, toxicity to mammals, corrosiveness, effectiveness only at high concentrations, etc.

An object of this invention is to provide improved chemical methods for weed control.

Another object of this invention is to provide a new class of biological toxicants.

Another object of this invention is to provide a new class of chemical compounds.

These and other objects of the invention are provided by reacting vinylene carbonate of the structure

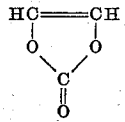

with a halocyclopentadiene derivative of the structure

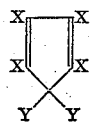

where X is a halogen atom having an atomic weight of below 100, i. e., chlorine, bromine or fluorine, and Y is selected from the class consisting of halogen atoms having an atomic weight of below 100, lower alkoxy radicals, and lower alkylmercapto radicals, wherein said lower alkoxy and lower alkylmercapto radicals contain up to 4 carbon atoms, to give an adduct of the structure

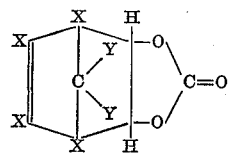

where X and Y are as defined above.

Vinylene carbonate may be readily prepared by various means, e. g., by reaction of ethylene oxide with carbon dioxide to give 1,2-ethylene carbonate, which is then halogenated and subsequently dehydrohalogenated to produce vinylene carbonate.

The halocyclopentadiene derivatives used in producing the compounds of the invention are the tetra-, penta- and hexahalocyclopentadienes, lower alkoxyhalocyclopentadienes and lower alkylmercaptohalocyclopentadienes, wherein the lower alkoxy and lower alkylmercapto radicals of said cyclopentadienes contain up to 4 carbon atoms. As examples of halocyclopentadienes may be mentioned, e. g., tetrachlorocyclopentadiene, pentachlorocyclopentadiene, hexachlorocyclopentadiene, hexabromocyclopentadiene, monochloropentabromocyclopentadiene, 5,5-difluorotetrachlorocyclopentadiene, etc. As examples of useful alkoxyhalocyclopentadienes may be listed the 5,5-dialkoxytetrahalocyclopentadienes such as 5,5-dimethoxytetrachlorocyclopentadiene, 5,5 - diethoxytetrachlorocyclopentadiene, 5,5-dibutoxytetrabromocyclopentadiene, 5,5-diisopropoxytetrachlorocyclopentadiene, etc. The dialkoxycyclopentadienes are prepared by heating the appropriate alkanol with a hexahalocyclopentadiene in the presence of a condensation agent. Also suitable for the diene synthesis with vinylene carbonate to produce the compounds of the invention are the thio-analogs of the alkoxy derivatives of halocyclopentadiene mentioned above, e. g., 5,5-bis(methylmercapto)tetrachlorocyclopentadiene, 5,5-bis(ethylmercapto)tetrachlorocyclopentadiene, 5,5-bis(isopropylmercapto)tetrabromocyclopentadiene, etc.

This invention provides, by the reaction of vinylene carbonate with halocyclopentadienes, 1,4,5,6-tetrahalobicyclo[2.2.1]-5-heptene-2,3-diol carbonates as represented by the adduct formula shown above. Examples of the bicycloheptenes provided by the process of this invention are 1,4,5,6,7,7-hexachlorobicyclo[2.2.1]-5-heptene-2,3-diol carbonate, 1,4,5,6-tetrachlorobicyclo[2.2.1]-5-heptene-2,3-diol carbonate, 1,4,5,6,7-pentachlorobicyclo[2.2.1]-5-heptene-2,3-diol carbonate, 1,4,5,6,7,7-hexabromobicyclo[2.2.1]-5-heptene-2,3-diol carbonate, 1,4,5,6-tetrachloro-7,7-difluorobicyclo[2.2.1]-5-heptene-2,3 - diol carbonate, 1, 4, 5, 6 - tetrachloro-7,7 - dimethoxybicyclo-[2.2.1]-5-heptene-2,3-diol carbonate, 1,4,5,6-tetrachloro-7,7-dibutoxybicyclo[2.2.1]-5-heptene-2,3-diol carbonate, 1,4,5,6 - tetrachloro - 7,7 - bis(methylmercapto)bicyclo-[2.2.1]-5-heptene-2,3-diol carbonate, etc.

It will be evident to those skilled in the art that the present diol carbonates are susceptible of existing in a variety of stereochemical configurations. In accordance with the Alder rules for Diels-Alder adduct formation (R. Adams, ed., "Organic Reactions, vol. 4," N. Y., Wiley, 1948, p. 10), we believe that the present compounds are probably obtained in the cis-endo configuration. However, it is intended that the present invention be limited only as provided by the unambiguous planar adduct formula as given in the appended claims.

The compounds of the invention readily prepared by contacting vinylene carbonate with the cyclopentadiene at elevated temperatures of above 100° C., e. g., from 100 to 250° C., and preferably 150–200° C. The reaction may be carried out in the absence of a solvent, if desired; as solvents or diluents may be used any liquid boiling in the requisite temperature range, e. g., aromatic or aliphatic hydrocarbons such as toluene, xylene and naphthas, chlorinated solvents such as o-dichlorobenzene and tetrachloroethane, oxygenated solvents such as acetophenone and 2-(2-ethoxyethoxy)-ethyl acetate, etc. The addition of the vinylene carbonate to the halocyclopentadiene by the Diels-Alder reaction takes place readily at atmospheric pressure when the reactants are refluxed in a solvent at elevated temperatures; subatmospheric pressures may also be used, e. g., when high-boiling solvents are employed, or superatmospheric pressures, e. g., when the reaction is carried out in the absence of a solvent. Catalysts may be used if desired, through the reaction generally takes place readily in the absence of any catalyst. Since this is a 1:1 addition reaction, usually the reactants will be present in equimolecular quantities; if desired, one of the reactants may be present in excess of that required for the reaction, since unreacted starting material is readily removed from the solvent at the end of the reaction, e. g., by distillation. The products are readily isolated by distilling off solvents or unreacted starting materials.

The invention is further illustrated, but not limited, by the following examples:

*Example 1*

One hundred and ten grams (0.407 mole) of hexachlorocyclopentadiene and 35 g. (0.407 mole) of vinylene carbonate were charged to a glass-lined 300-ml. bomb and heated with stirring for 18 hours at 180° C. The tan solids removed from the bomb were recrystallized from hexane, giving a chalky-white material melting at 233–234° C. and weighing 80 g. A portion of this product was further purifierd, by two more recrystallizations from hexane and drying under vacuum, to analyze as follows:

|  | Found | Calculated for $C_8H_2O_3Cl_6$ |
|---|---|---|
| Percent C | 26.97 | 26.78 |
| Percent H | 0.74 | 0.56 |
| Percent Cl | 59.37 | 59.28 |

*Example 2*

A mixture of 8.6 grams (0.1 mole) vinylene carbonate and 28.3 g. (about 0.1 mole) of hexachlorocyclopentadiene was stirred together with 50 ml. Hi-Flash naphtha and the mixture was refluxed at about 160° C. for four hours. The reaction mixture was then distilled under reduced pressure to remove solvent, leaving a residue which, after recrystallization from hexane, weighed 22 g., and melted at 215–224° C. A second recrystallization from hexane gave 18 g. which melted at 232–233° C. An additional crop of product adduct could be obtained from the hexane filtrate.

*Example 3*

A mixture of 8.6 g. of vinylene carbonate and 28.3 g. of hexachlorocyclopentadiene with 50 ml. of tetrachloroethane was refluxed at 150° C. for six hours. After removal of the solvent under reduced pressure, the residual solid was recrystallized from hexane and dried, to yield 22 g. of material melting at 220–223° C. This material was recrystallized again from hexane giving 20 g. of product melting at 232–233° C. Further product could be recovered from the filtrate.

*Example 4*

A mixture of 86 g. (1.0 mole) of vinylene carbonate and 272.8 g. (1.0 mole) of hexachlorocyclopentadiene with 500 ml. of o-dichlorobenzene was refluxed at 170–180° C. for 8 hours, after which the solvent was removed by distillation under reduced pressure, leaving 332 g. of a tan solid, which is 93 percent of the theoretical yield. On recrystallization from hexane, the product 1,4,5,6,7,7-hexachlorobicyclo[2.2.1]-5-heptene-2,3-diol carbonate was obtained as white crystals melting at 233–234° C.

*Example 5*

A mixture of 50 ml. of o-dichlorobenzene, 8.6 g. of vinylene carbonate and 28.5 g. of hexachlorocyclopentadiene was refluxed for four hours, after which the solvent was removed by vacuum distillation, leaving 39 g. of solid. Recrystallization of this material from hexane gave 35 g. of white needles melting at 232–233° C., which is a yield of 97 percent of theoretical.

*Example 6*

A mixture of 50 ml. of o-dichlorobenzene, 8.6 g. (0.1 mole) of vinylene carbonate, and 26.4 g. (0.1 mole) of 5,5-dimethoxy-1,2,3,4-tetachlorocyclopentadiene was refluxed for 16 hours. After removal of the solvent by vacuum distillation, 33 g. of crude 1,4,5,6-tetrachloro-7,7-dimethoxybicyclo[2.2.1] - 5 - heptene - 2,3-diol carbonate were obtained. Recrystallization of the crude material from benzene gave white crystals which melted at 157–158° C., and analyzed as follows:

|  | Found | Calculated for $C_{10}H_8Cl_4O_5$ |
|---|---|---|
| Percent C | 34.68 | 34.31 |
| Percent H | 2.13 | 2.30 |

The vinylene carbonate-halocyclopentadiene adducts are well-characterized, stable crystalline compounds, which are useful for a variety of agricultural and industrial applications. They are readily hydrolyzed to a bicycloheptenediol, which may be converted to various useful products, e. g., plasticizers, dielectric, polyesters, etc. The cyclic carbonates are also useful in the unhydrolyzed form and are particularly effective as biological toxicants, i. e., selective herbicides. The selective activity of the present compounds as pre-emergent herbicides is surprising, since, as will be shown below, compounds of very closely related structure do not possess such pronounced activity. The testing of the product of Example 5 as a herbicide, as compared to the compound of the structure

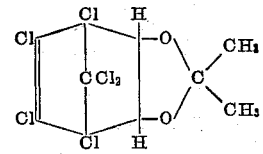

the acetone acetal of 1,4,5,6,7,7-hexachlorobicyclo[2.2.1]-5-heptene-2,3-diol, prepared as described in our application Serial Number 510,053 of even date, is described in the following example:

*Example 7*

Aluminum pan flats filled with a mixture of two parts of top soil screened through a ¼" wire mesh and one part sand were randomly seeded over one-third of their surfaces with grass and corn seeds, and over the remaining two-thirds of their surfaces, with seeds of broad-leaved plants. The seeds were then covered with a ⅜" layer of soil, and the seeded pans sprayed with an aqueous solution of a liquid fertilizer and an insecticide (octamethyl pyrophosphate). The pans were then each sprayed with 30 cc. of acetone containing, respectively, 0.2 g. of 1,4,5,6,7,7-hexachlorobicyclo[2.2.1]-5-heptene-2,3-diol carbonate, 0.08 g. of 1,4,5,6,7,7-hexachlorobicyclo[2.2.1]-5-heptene-2,3-diol carbonate, and 0.2 g. of the acetone acetal of 1,4,5,6,7,7-hexachlorobicyclo[2.2.1]-5-heptene-2,3-diol. These rates of application correspond respectively, to 25, 10, and 25 pounds per acre of the compounds. The pans were next placed in a half inch of water and allowed to absorb moisture through their perforated bottoms until the soil surfaces were completely moist. Then the pans were kept on a wet sand bench in a greenhouse for ten days, after which the plant growth was observed. It was found that, in the pans sprayed with either the 25 pounds per acre or the ten pounds per acre concentrations of 1,4,5,6,7,7-hexachlorobicyclo[2.2.1]-5-heptene-2,3-diol carbonate, the growth of the grasses was substantially suppressed, and such grasses as grew were badly crippled. Broad-leaved plants, and corn, on the other hand, grew normally without noticeable effects from the treatment. By contrast, both grasses and corn, and broad-leaved plants were substantially completely unaffected, as determined by visual inspection, by the application of the acetone acetal of 1,4,5,6,7,7-hexachlorobicyclo[2.2.1]-5-heptene-2,3-diol at the rate of 25 lbs. per acre, the plants all having germinated and grown normally.

The compound of Example 5 was further tested by applications at the rate of 5 lbs. per acre to a similarly planted pan. Again, even at this low rate of application, the grasses were severely damaged, while cotton and corn, for example, grew normally. The rate at which the present compounds are applied in practice will depend on the extent of weed infestation, and may vary from 1 to 5 lbs. per acre, or less. The present compounds may be applied as solutions, e. g., in petroleum oils, or they may be compounded with inert solid carriers such as talc, bentonite, diatomaceous earth, calcium carbonate, etc. A particularly effective method of application of the present compounds is as an aqueous emulsion. Emulsions of the bicycloheptenes can be prepared, for example, by dissolving the heptene in an organic solvent, adding a wetting agent, and then adding water to make an oil-in-water emulsion. Wetting agents effective for preparing such compositions are, for example, soaps such as sodium abietate, long chain alcohols such as dodecyl alcohol, alcohol sulfate salts such as sodium dodecyl sulfate, alkyl sulfonates such as dioctyl sodium sulfosuccinate, fatty acid esters such as sorbitan monolaurate, etc.

What is claimed is:

1. A compound of the structure

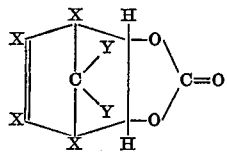

where X is a halogen atom having an atomic weight of below 100, Y is selected from the class consisting of halogen atoms having an atomic weight of below 100, lower alkoxy radicals, and lower alkylmercapto radicals, where said lower alkoxy radicals and lower alkylmercapto radicals containing up to 4 carbon atoms.

2. 1,4,5,6,7,7 - hexachlorobicyclo[2.2.1]-5-heptene-2,3-diol carbonate.

3. 1,4,5,6 - tetrachloro-7,7-dimethoxybicyclo[2.2.1]-5-heptene-2,3-diol carbonate.

4. The process which comprises contacting vinylene carbonate of the formula

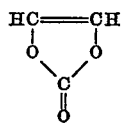

with a halocyclopentadiene of the formula

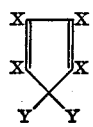

where X is a halogen atom having an atomic weight of below 100, and Y is selected from the class consisting of halogen atoms having an atomic weight of below 100, lower alkoxy radicals, and lower alkylmercapto radicals, wherein said lower alkoxy radicals and lower alkylmercapto radicals contain up to 4 carbon atoms, and isolating from the resulting reaction product a compound of the structure

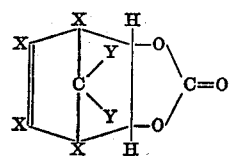

where X and Y are as hereinbefore defined.

5. The process which comprises contacting vinylene carbonate with hexachlorocyclopentadiene and isolating from the reaction product 1,4,5,6,7,7-hexachlorobicyclo-[2.2.1]-5-heptene-2,3-diol carbonate.

6. The process of claim 5, wherein the reaction is carried out in an inert organic solvent.

7. The process of claim 5, wherein the reaction is carried out in o-dichlorobenzene.

8. The process which comprises contacting vinylene carbonate with 1,2,3,4-tetrachloro-5,5-dimethoxycyclopentadiene and isolating from the reaction product 1,4,5,6-tetrachloro - 7,7 - dimethoxybicyclo[2.2.1]-5-heptene-2,3-diol carbonate.

9. A plant growth regulant composition comprising an inert carrier and as the essential effective ingredient, present in amount effective to regulate plant growth, a compound of the structure

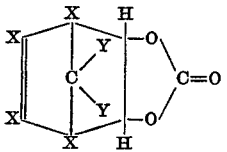

where X is a halogen atom having an atomic weight of below 100, Y is selected from the class consisting of halogen atoms having an atomic weight of below 100, lower alkoxy radicals, and lower alkylmercapto radicals, wherein the said lower alkoxy radicals and lower alkylmercapto radicals contain up to 4 carbon atoms.

10. A herbicidal composition comprising an oil-in-water emulsion of a carbonate ester of the formula

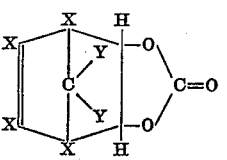

where X is a halogen atom having an atomic weight of below 100, and Y is selected from the class consisting of halogen atoms having an atomic weight of below 100, lower alkoxy radicals, and lower alkylmercapto radicals, wherein said lower alkoxy radicals and lower alkylmercapto radicals contain up to 4 carbon atoms, said carbonate ester being present in the said herbicidal composition in phytotoxic amount.

11. A plant growth regulant composition comprising a powdered carrier, a wetting agent, and as the essential effective ingredient, 1,4,5,6,7,7-hexachlorobicyclo[2.2.1]-5-heptene-2,3-diol carbonate.

12. The method of preventing plant growth which comprises applying to media normally supporting such growth, a toxic quantity of a herbicidal composition comprising an inert carrier and as the essential effective ingredient, present in phytotoxic amount, a compound of the structure

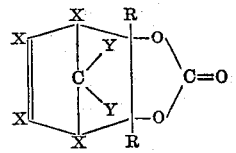

where X is a halogen atom having an atomic weight of below 100, and Y is selected from the class consisting of halogen atoms having an atomic weight of below 100, lower alkoxy radicals, and lower alkylmercapto radicals, wherein said lower alkoxy radicals and lower alkylmercapto radicas contain up to 4 carbon atoms.

References Cited in the file of this patent

UNITED STATES PATENTS

| | | |
|---|---|---|
| 2,552,567 | McBee et al. | May 15, 1951 |
| 2,606,910 | Herzfeld et al. | Aug. 12, 1952 |
| 2,635,979 | Lidov | Apr. 21, 1953 |
| 2,697,103 | Ordas | Dec. 14, 1954 |